(12) United States Patent
Teague

(10) Patent No.: US 7,883,337 B2
(45) Date of Patent: Feb. 8, 2011

(54) ELECTRICAL CONNECTOR

(75) Inventor: Phillip Vincent Teague, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 12/597,614

(22) PCT Filed: Apr. 24, 2008

(86) PCT No.: PCT/GB2008/050292

§ 371 (c)(1),
(2), (4) Date: Oct. 26, 2009

(87) PCT Pub. No.: WO2008/139213

PCT Pub. Date: Nov. 20, 2008

(65) Prior Publication Data

US 2010/0130065 A1 May 27, 2010

(30) Foreign Application Priority Data

May 14, 2007 (GB) ............................... 0709128.3

(51) Int. Cl.
*H01R 41/00* (2006.01)
(52) U.S. Cl. ........................................................ 439/32
(58) Field of Classification Search ............... 439/32, 439/640
See application file for complete search history.

(56) References Cited

U.S. PATENT DOCUMENTS

| 1,558,211 | A | * | 10/1925 | Williams | 439/92 |
| 3,783,431 | A | | 1/1974 | Badey et al. | |
| 3,919,509 | A | | 11/1975 | Schnitzius | |
| 4,046,448 | A | | 9/1977 | Miller | |
| 4,245,873 | A | * | 1/1981 | Markowitz | 439/32 |
| 4,615,499 | A | | 10/1986 | Knowler | |
| 5,441,416 | A | | 8/1995 | Gajewski et al. | |
| 5,895,275 | A | * | 4/1999 | Harbertson | 439/21 |
| 6,004,138 | A | * | 12/1999 | Harbertson | 439/32 |
| 6,015,117 | A | | 1/2000 | Broadbent | |
| 6,077,086 | A | * | 6/2000 | LaRoche | 439/32 |
| 6,488,511 | B1 | * | 12/2002 | Stewart | 439/32 |

(Continued)

FOREIGN PATENT DOCUMENTS

GB        662540        12/1951

(Continued)

OTHER PUBLICATIONS

Electrothermal Systems, DOT/FAA/CT-88/8-2, Chapter II, Section 2.0, Format Update Aug. 2001.

(Continued)

*Primary Examiner*—James Harvey
(74) *Attorney, Agent, or Firm*—Lowe, Hauptman, Ham & Berner, LLP

(57) ABSTRACT

An electrical connector for providing electrical communication between a fixed structure of an aircraft and a movable component mechanically connected to the fixed structure, wherein the electrical connector is arranged to be mechanically connected to the fixed structure at a first end of the connector and is arranged to be mechanically connected to the movable component at a second end of the connector, the electrical connector comprising a first telescopic element, at least a portion of which is electrically conductive and which is arranged to provide a first current path between the fixed structure and the movable component.

6 Claims, 3 Drawing Sheets

U.S. PATENT DOCUMENTS

| | | |
|---|---|---|
| 7,370,739 B2 | 5/2008 | Tsukamoto et al. |
| 2008/0078879 A1 | 4/2008 | Weaver |
| 2010/0130065 A1* | 5/2010 | Teague .................. 439/640 |

FOREIGN PATENT DOCUMENTS

| | | |
|---|---|---|
| GB | 1596370 | 8/1981 |
| GB | 2417937 A | 3/2006 |
| WO | 2006027624 A | 3/2006 |

OTHER PUBLICATIONS

ISR and Written Opinion for PCT/GB2008/050292 mailed Sep. 18, 2008.

UK Search Report for GB0709128.3 dated Aug. 30, 2007.

* cited by examiner

ELECTRICAL CONNECTOR

RELATED APPLICATIONS

The present application is a National Phase of International Application Number PCT/GB2008/050292 filed Apr. 24, 2008, and claims priority from British Application Number 0709128.3 filed May 14, 2007, the disclosures of which are hereby incorporated by reference herein in their entirety.

BACKGROUND OF THE INVENTION

It is common place for aircraft to include one or more components that are movable with respect to a main aircraft structure. For example, it is common practice for the wing structure on conventional aircraft to include a number of movable components, generally referred to as slats, located along the leading edge of each wing structure, with each slat being movable between a stowed, or retracted, position and an extended, or deployed, position in which the slat is generally rotationally translated and linearly extended forward of the leading edge of the wing structure. One or more mechanical actuators are ordinarily used to cause the desired translation of the movable component between its stowed and deployed positions.

It is also quite common for the movable components to have one or more electrical devices mounted on or within the movable component, such as heating elements for wing de-icing or one or more electrical sensors. These electrical devices require an electrical connection to be maintained between the movable component and the remainder of the aircraft structure when the movable component is in both the stowed and deployed positions. One method of achieving this is to provide the electrical connection between the movable component and the fixed aircraft structure by means of an electrical cable of sufficient length to reach the electrical component when it is the deployed, or extended, position. However, in providing an electrical cable of sufficient length to reach the device when the electrical component is in the deployed position necessarily means that there is an excess of cable when the movable component is in the stowed position. Whilst it is possible to arrange for the electrical cable to be physically restrained in discrete "loops" when the movable component is stowed, accommodating the excess cable in the stowed position is nonetheless problematic. It is both problematic in the sense that sufficient space must be provided within either the movable component or the corresponding fixed aircraft structure to accommodate the loops of cable when the movable component is in the stowed position and is also problematic in the sense that the stowed loops of electrical cable can in some circumstances move about when the aircraft is in motion and contact other systems or structures causing wear and damage to both the other systems or structures and the electrical cables themselves. A further disadvantage of this arrangement is that it is difficult to protect the electrical cable when the movable component is in the deployed or extended position, such that the electrical cable is exposed to the airflow and any contaminants within that airflow, such as grit, water, ice or snow.

SUMMARY

According to the first aspect of the present invention there is provided an electrical connector for providing electrical communication between a fixed structure of an aircraft and a movable component mechanically connected to the fixed structure, wherein the electrical connector is arranged to be mechanically connected to the fixed structure at a first end of the connector and is arranged to be mechanically connected to the movable component at a second end of the connector, the electrical connector comprising a first telescopic element, at least a portion of which is electrically conductive and which is arranged to provide a first current path between the fixed structure and the movable component, wherein the first telescopic element is hollow and the electrical connector further comprises a second telescopic element located within the first telescopic element, at least a portion of the second telescopic element being electrically conductive and arranged to provide a second current path between the fixed structure and the movable component.

Additionally, the second telescopic element may be supported by one or more spacers, each spacer being non-conductive and being arranged to support the second telescopic element in a fixed spatial relationship to the first telescopic element.

Additionally or alternatively, each telescopic element may be manufactured from a metallic material. Alternatively, the electrically conductive portion of each telescopic element comprises a conductive strip. Furthermore, each telescopic element may comprise a plurality of conductive strips, each strip being insulated from one another.

Additionally or alternatively, each telescopic element may comprise a non-conductive material on which the or each conductive strip is mounted.

BRIEF DESCRIPTION OF THE DRAWINGS

Embodiments of the present invention will now be described, by way of illustrative example only, with reference to the accompanying figures, of which.

DETAILED DESCRIPTION OF THE DRAWINGS

Figure 1:
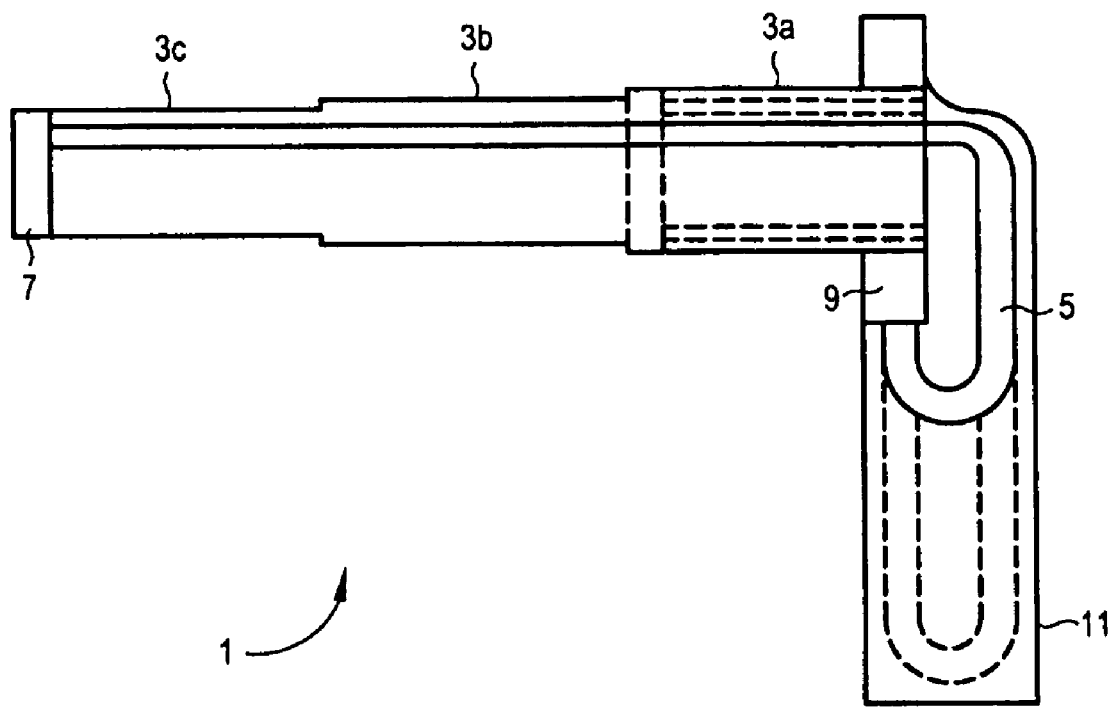
FIG. 1 schematically illustrates an electrical connection system according to the prior art.

FIG. 1 schematically illustrates an electrical connector for providing electrical communication between relative movable parts of an aircraft structure according to the prior art. In the prior art arrangement shown in FIG. 1 a telescopic member 1 is provided that can be extended from a closed or stowed position, indicated by the chained lines and an extended position, indicated by the solid lines. In the particular example illustrated in FIG. 1 the telescopic member 1 comprises three separate tubes 3a, 3b and 3c, with tube 3c being slidably received within tube 3b, which in turn is slidably received within outer tube 3a. An electrical cable 5 is at one end secured to the remote end 7 of the extending element 1, which in use is connected to one or more electrical devices within a movable component of the aircraft structure. The opposite end of the cable 5 is secured to a main electrical connector 9, that is in electrical communication with the main electrical systems within the fixed aircraft structure. A housing 11 is provided in which the cable 5 is stowed, as indicated by the chained lines, when the telescopic element is in the retracted position. However, although the cable 5 is enclosed within the housing 11 and the telescopic element 3, thus giving some protection to the electrical cable 5 from the airflow, this prior art solution still suffers the previously mentioned disadvantages of requiring a finite amount of space to accommodate the cable housing 11 and does not overcome the problem of the cable 5 from becoming damaged by being brought into repeated contact with the interior walls of the housing 11 as the aircraft is in motion.

Figure 2:
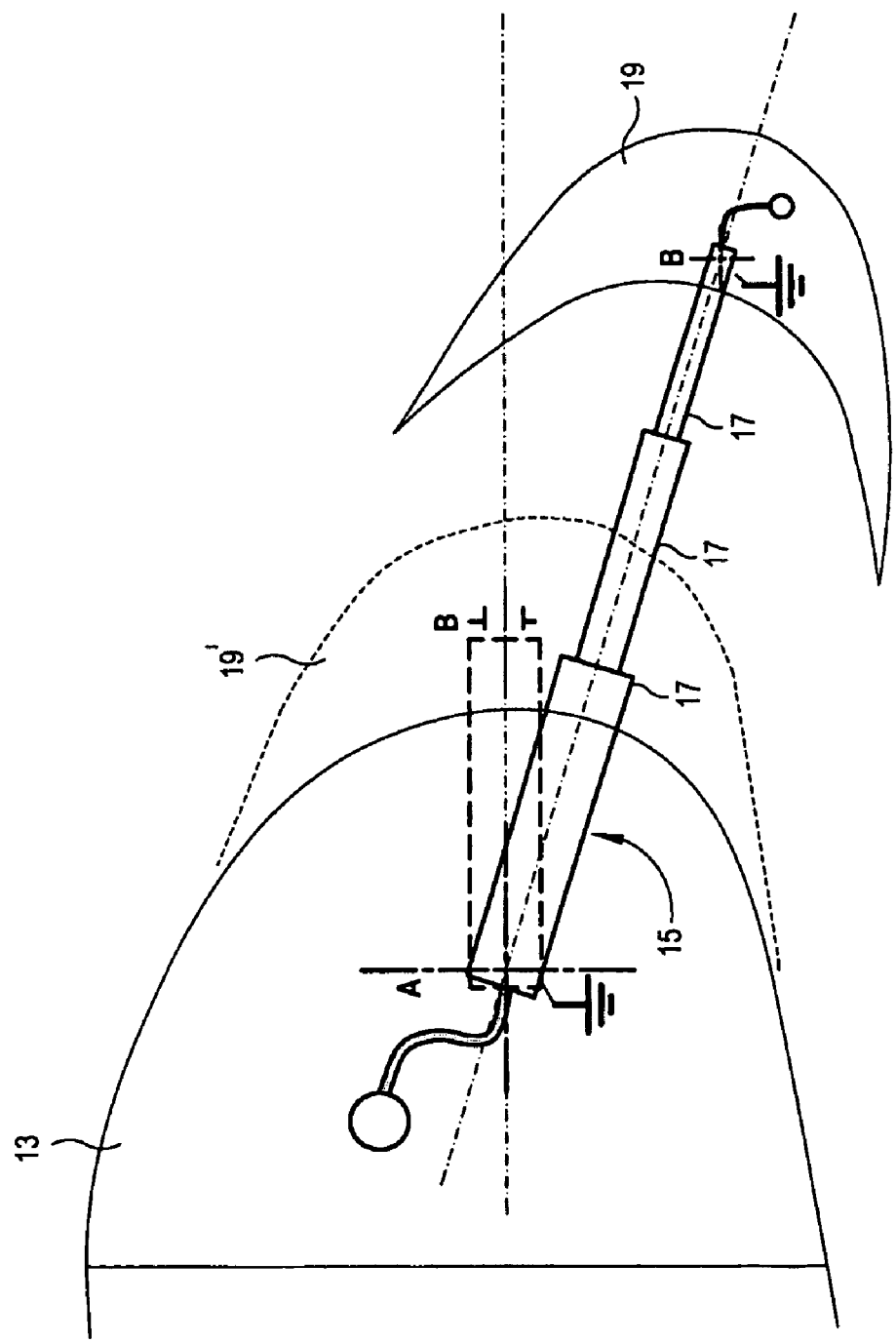
FIG. 2 schematically illustrates an electrical connector according to an embodiment of the present invention in combination with a movable component of an aircraft in both stowed and deployed positions.

FIG. 2 schematically illustrates an electrical connector according to an embodiment of the present invention, in both its deployed and stowed positions. A fixed portion 13 of an aircraft structure, such as the main wing structure, is provided to which a first end of the telescopic connector 15 is attached. In the particular embodiment illustrated in FIG. 2, the telescopic connector 15 is pivotably attached to the fixed wing structure 13 at a pivot point A. The telescopic connector 15 comprises a number of outer tubes, numbering 3 in the particular embodiment illustrated in FIG. 2. Each outer tube 17 fits within one another in a sliding fashion, with the largest outer tube preferably being that attached to the fixed aircraft structure 13. The opposite end of the telescopic connector 15 is connected to a movable component 19 of the aircraft wing, for example a wing slat or flap. In FIG. 2 the movable component 19 is illustrated in solid lines in the extended position and is illustrated in its stowed position 19' by dotted lines. The movable component 19 is translated between its stowed and deployed position by further mechanical actuators, not illustrated. Again, in the particular example illustrated, the end of the telescopic connector connected to the movable component 19 is connected by means of a pivotable connection B. The telescopic connector 15 provides the communication of electrical power or communication signals between the fixed structure 13 and the movable component 19, as explained more clearly with reference to FIG. 3.

Figure 3:
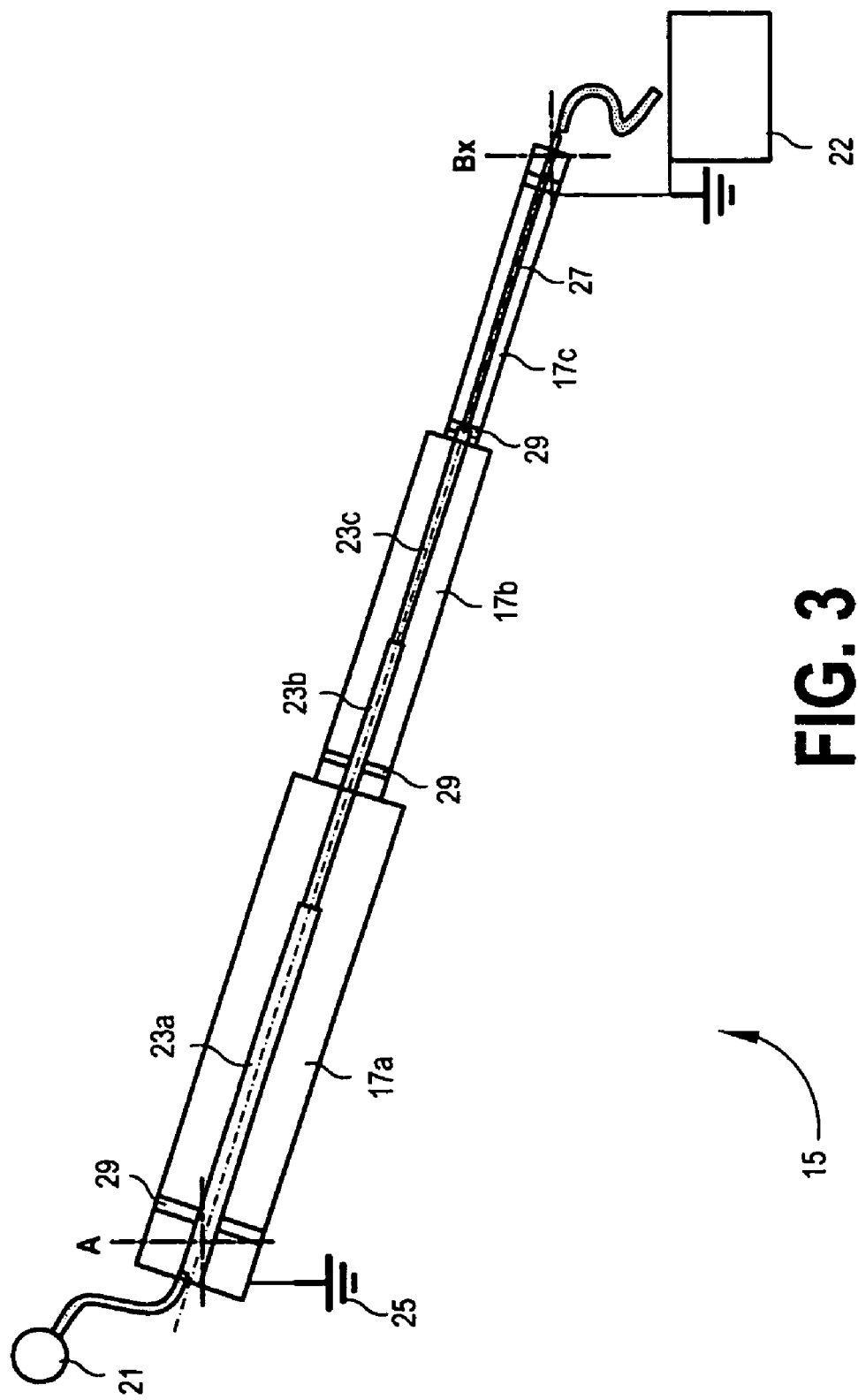
FIG. 3 schematically illustrates the electrical connector of FIG. 2 in greater detail.

FIG. 3 illustrates the telescopic connector 15 of FIG. 2 in great detail and in cross-section. In the particular embodiment illustrated, the connector 15 comprises three outer telescopic members 17a, 17b and 17c. In preferred embodiments these comprise cylindrical tubes arranged to slidably fit one with the other, i.e. such that the smallest diameter telescopic element 17c is slidably received within telescopic element 17b, which in turn is slidably received within the telescopic element 17a. It will of course be appreciated that more or less telescopic elements may be provided as required and other geometries apart from cylindrical tubes may be adopted if desired. Each telescopic outer element 17 preferably comprises an electrically conductive material, such as low electrical resistance metal. At the first end of the telescopic connector 15, the first outer telescopic element 17a is electrically connected to a first electrical path 21. At the opposite end of the telescopic connector 15 the final outer telescopic element 17c is connected to an electrical device 22, which may an electrical heating for de-icing purposes or one or more items of electronic apparatus. By virtue of the electrical conductivity of the outer telescopic elements 17 the embodiment of the present invention illustrated thus provides a first electrical path between the fixed structural portion of the aircraft and the movable component 19. The outer telescopic elements 17 are hollow and house a plurality of internal telescopic elements 23a, 23b and 23c. In an analogous manner to the outer telescopic elements 17, the inner telescopic elements 23 are preferably cylindrical tubes that are slidably received within one another and are electrically conductive. Again, in the particular embodiment illustrated in FIG. 3, there are three internal telescopic elements provided, although it will again be appreciated that this number may vary as desired. The internal telescopic elements 23 extend between the end of the outer telescopic elements 17a at which the telescopic connector 15 is connected to the fixed structural element of the aircraft 13 and the end of the final outer telescopic elements 17c opposite to the end of that outer telescopic element at which the movable component 19 of the aircraft is connected. In other words, the internal telescopic elements do not extend through the length of the final outer telescopic elements 17c. A second electrical connection 25 is provided within the fixed aircraft structure 13 to the first internal telescopic element 23a. A corresponding connection is made between the electrical device 22 mounted within the movable component 19 and the last internal telescopic element 23c via a fixed length electrical connector 27 extending through the interior of the final outer telescopic element 17c. One or more insulating supports 29 may be provided within the outer telescopic elements 17 and through which the internal telescopic elements 23 pass so as to provide support for the internal telescopic elements 23 whilst providing electrical insulation between the internal telescopic elements 23 and external telescopic elements 17. For example, insulating supports 29 may comprise circular disks of insulating material with appropriately sized central holes formed therein through which the internal telescopic elements 23 are free to pass.

To maintain the desired electrical connections between the individual outer telescopic elements and also between individual internal telescopic elements, conductive collars may be provided that are slidably received between the walls of adjacent telescopic elements, each collar being made of electrically conductive and mechanically resilient material and arranged so as to be mechanically urged between one telescopic element and another. By providing such resilient collars located between adjacent telescopic elements, such that the collars are mechanically urged into contact with adjacent telescopic elements as those elements are slidably moved relative to one another, a good electrical contact is maintained between adjacent telescopic elements. Additional conventional sealing arrangements may be provided between at least the individual external telescopic elements 17 so as to prevent the ingress of contaminants such as moisture or grit.

Since the external telescopic elements 17 provide a first electrical path themselves and the internal telescopic elements 23 provide a second, return, electrical path themselves, any requirement for discrete electrical cables is removed and therefore the telescopic connector of the present invention does not experience the previously mentioned disadvantages suffered by systems utilising discrete lengths of electrical cables.

Whilst in preferred embodiments the entirety of the external and internal telescopic elements are electrically conductive, i.e. the telescopic elements are themselves manufactured from electrically conductive material, it will be appreciated that in other embodiments encompassed by the present invention discrete the main body of each telescopic element may be manufactured from a non-electrically conductive material, with a discrete conductive track or strip being formed on each telescopic element and being arranged to slide over one another as the telescopic elements move. The provision of discrete electrical paths in such a manner formed on a non-conductive body also allows multiple connections to be formed on a single telescopic connector, thus allowing either multiple electrical devices to be housed within the movable component and connected to the fixed structure by a single telescopic connector, thereby achieving savings in weight and space, or multiplexed communications, for example 8-bit digital signals, to be transmitted between the fixed aircraft structure and a microprocessor controlled device mounted in the movable component. Furthermore, in further embodiments of the present invention only a single set of telescopic elements may be provided that may provide one or more electrical paths.

The invention claimed is:

1. An electrical connector for providing electrical communication between a fixed structure of an aircraft and a movable component mechanically connected to the fixed structure, wherein the electrical connector is arranged to be mechanically connected to the fixed structure at a first end of the connector and is arranged to be mechanically connected to the movable component at a second end of the connector, the electrical connector comprising a first telescopic element, at least a portion of which is electrically conductive and which is arranged to provide a first current path between the fixed structure and the movable component, wherein the first telescopic element is hollow and the electrical connector further comprises a second telescopic element located within the first telescopic element, at least a portion of the second telescopic element being electrically conductive and arranged to provide a second current path between the fixed structure and the movable component.

2. An electrical connector according to claim 1, wherein the second telescopic element is supported by one or more spacers, each spacer being non-conductive and being arranged to support the second telescopic element in a fixed spatial relationship to the first telescopic element.

3. An electrical connector according to any preceding claim, wherein each telescopic element is manufactured from a metallic material.

4. An electrical connector according to claim 3, wherein each telescopic element comprises a non-conductive material on which a plurality of conductive strips are mounted.

5. An electrical connector according to claim 1, wherein the electrically conductive portion of each telescopic element comprises a conductive strip.

6. An electrical connector according to claim 3, wherein each telescopic element comprises a plurality of conductive strips, each strip being insulated from one another.

* * * * *